(12) United States Patent
Jenko et al.

(10) Patent No.: US 12,246,476 B2
(45) Date of Patent: Mar. 11, 2025

(54) NOZZLE WITH REMOVABLE NOZZLE TIP CONFIGURED FOR IMPROVED HEATING

(71) Applicant: HUSKY INJECTION MODLING SYSTEMS LTD., Bolton (CA)

(72) Inventors: Edward Joseph Jenko, Essex, VT (US); James Osborne Plumpton, Enosburg Falls, VT (US); Thomas Andrew Lawrence, Burlington, VT (US)

(73) Assignee: Husky Injection Molding Systems Ltd., Bolton (CA)

( * ) Notice: Subject to any disclaimer, the term of this patent is extended or adjusted under 35 U.S.C. 154(b) by 0 days.

(21) Appl. No.: 17/255,992

(22) PCT Filed: Jun. 20, 2019

(86) PCT No.: PCT/US2019/038150
§ 371 (c)(1),
(2) Date: Dec. 23, 2020

(87) PCT Pub. No.: WO2020/005691
PCT Pub. Date: Jan. 2, 2020

(65) Prior Publication Data
US 2021/0122095 A1     Apr. 29, 2021

Related U.S. Application Data

(60) Provisional application No. 62/689,343, filed on Jun. 25, 2018.

(51) Int. Cl.
*B29C 45/27* (2006.01)
*B25B 13/50* (2006.01)
*F16D 41/07* (2006.01)

(52) U.S. Cl.
CPC ........ *B29C 45/278* (2013.01); *B25B 13/5008* (2013.01); *B29C 45/2737* (2013.01);
(Continued)

(58) Field of Classification Search
CPC ...... B29C 2045/2772; B29C 2045/274; B29C 45/278; B29C 45/2737; B25B 13/5016; B25B 13/5066; B25B 13/5008
See application file for complete search history.

(56) References Cited

U.S. PATENT DOCUMENTS 627,075 A * 6/1899 Gifford ................... B25B 13/52
                                                                        81/64
651,220 A * 6/1900 Warnock ................. B25B 13/52
                                                                        81/64

(Continued)

FOREIGN PATENT DOCUMENTS

DE    102008055640 A1    5/2010
JP       2015102197 A      6/2015

OTHER PUBLICATIONS

Wikipedia, Sprag Clutch, Nov. 11, 2017, pp. 1-4, XP055900549, Retrieved From Internet: URL:https://en.wikipedia.org/w/index.php?title+=Sprag-Clutch&oldid=809831454 [Retrieved on Mar. 14, 2022, pp. 1-4. Relevant to Claims, 9-14.

(Continued)

*Primary Examiner* — Emmanuel S Luk
(74) *Attorney, Agent, or Firm* — Rowand LLP

(57) ABSTRACT

The present application describes injection molding machines and, more particularly, a removable nozzle tip and nozzle assembly for use with an injection molding machine and an engagement tool and methods for replacing a nozzle tip. In an aspect, an injection molding machine may include a nozzle. The nozzle may include a nozzle housing and a nozzle tip threadably attached to the nozzle housing. At least a portion of an exterior wall of the nozzle housing and at (Continued)

least a portion of an exterior wall of the nozzle tip may align to provide a cylindrical surface. The injection molding machine may further include a tubular heater enclosing at least a portion of the continuous cylindrical surface. The nozzle tip does not include a torque feature in any location that is downstream of the tubular heater and upstream of a mold gate of the nozzle.

8 Claims, 6 Drawing Sheets

(52) U.S. Cl.
CPC ...... *B29C 2045/274* (2013.01); *B29C 2045/2772* (2013.01); *F16D 41/07* (2013.01)

(56) References Cited

U.S. PATENT DOCUMENTS

| | | | | |
|---|---|---|---|---|
| 689,325 | A * | 12/1901 | Sands | B25B 13/52 81/64 |
| 1,050,169 | A * | 1/1913 | Price | B25B 13/52 81/69 |
| 1,150,663 | A * | 8/1915 | Cosseboom | B25B 13/52 81/68 |
| 1,498,009 | A * | 6/1924 | Ball | B67B 7/186 81/3.43 |
| 1,505,897 | A * | 8/1924 | Kikta | B25B 13/52 81/3.43 |
| 1,890,227 | A * | 12/1932 | McKee | B25B 13/52 81/64 |
| 2,058,949 | A * | 10/1936 | Borowski | B67B 7/186 81/3.43 |
| 2,498,582 | A * | 2/1950 | Schoenberger | B25B 13/52 81/3.43 |
| 2,780,951 | A * | 2/1957 | Georges | B25B 13/52 81/64 |
| 2,834,238 | A * | 5/1958 | Stover, Sr. | B25B 13/52 81/361 |
| 3,630,330 | A | 12/1971 | Pflugner | |
| 3,728,916 | A * | 4/1973 | Brantley | B25B 13/52 81/64 |
| 3,838,615 | A * | 10/1974 | McFarland | B25B 13/52 D8/21 |
| 4,161,386 | A * | 7/1979 | Osuna-Diaz | B29C 45/30 425/549 |
| 4,221,140 | A * | 9/1980 | Bracey | B25B 27/0042 81/64 |
| 4,257,288 | A * | 3/1981 | Bianco | B25B 13/52 81/65.2 |
| 4,532,833 | A * | 8/1985 | Downs | B25B 13/52 81/3.43 |
| 4,598,615 | A * | 7/1986 | Tate | B25B 13/52 81/3.43 |
| 4,660,445 | A * | 4/1987 | Windom | B67B 7/186 81/3.43 |
| 4,771,164 | A * | 9/1988 | Gellert | B29C 45/2737 425/549 |
| 4,916,993 | A * | 4/1990 | Siekawitch | B25B 13/52 81/3.43 |
| 4,987,804 | A * | 1/1991 | Greenawalt | B25B 13/52 81/3.43 |
| 5,309,797 | A * | 5/1994 | Nguyen | B25B 27/0042 81/3.43 |
| 5,464,342 | A * | 11/1995 | Marik | B29C 45/1735 264/572 |
| 5,573,185 | A * | 11/1996 | Schwarzkopf | B29C 45/74 392/473 |
| 5,868,046 | A * | 2/1999 | Eddy | B25B 13/52 81/3.43 |
| 5,879,727 | A * | 3/1999 | Puri | B29C 45/278 425/549 |
| 6,009,616 | A | 1/2000 | Gellert | |
| 6,044,944 | A | 4/2000 | Adams et al. | |
| 6,220,851 | B1 * | 4/2001 | Jenko | B29C 45/27 425/549 |
| 7,914,278 | B2 * | 3/2011 | Holliday | B29C 45/2737 425/549 |
| 8,555,753 | B2 * | 10/2013 | Price | B25B 13/52 81/367 |
| 9,475,640 | B2 * | 10/2016 | Sooy | B65G 7/12 |
| 9,616,604 | B2 * | 4/2017 | Sakurada | B23P 15/007 |
| 10,843,394 | B2 * | 11/2020 | Yasuda | B29C 45/20 |
| 11,518,075 | B2 * | 12/2022 | Ochiai | B29C 45/2806 |
| 2001/0033044 | A1 * | 10/2001 | Fikani | B29C 45/278 425/549 |
| 2002/0054932 | A1 * | 5/2002 | Gellert | B23P 15/007 425/549 |
| 2003/0082266 | A1 * | 5/2003 | Babin | B29C 45/278 425/569 |
| 2004/0037914 | A1 * | 2/2004 | Takeuchi | B29C 45/2806 425/567 |
| 2004/0101589 | A1 * | 5/2004 | Babin | B29C 45/2737 425/549 |
| 2004/0228942 | A1 * | 11/2004 | Guenther | B29C 45/278 425/564 |
| 2004/0258788 | A1 * | 12/2004 | Olaru | B29C 45/278 425/569 |
| 2005/0095313 | A1 * | 5/2005 | Ciccone | B29C 45/27 425/569 |
| 2005/0193872 | A1 * | 9/2005 | Wyman | B25B 13/48 81/64 |
| 2008/0206391 | A1 * | 8/2008 | Bouti | C21D 9/00 425/542 |
| 2008/0260889 | A1 * | 10/2008 | Jenko | B29C 45/278 425/549 |
| 2009/0074907 | A1 | 3/2009 | Gunther | |
| 2009/0148550 | A1 | 6/2009 | Mohammed | |
| 2010/0003358 | A1 | 1/2010 | Gunther | |
| 2010/0044896 | A1 | 2/2010 | Tabassi et al. | |
| 2010/0159062 | A1 * | 6/2010 | Klobucar | B29C 45/281 425/568 |
| 2011/0167964 | A1 * | 7/2011 | Price | B25B 13/52 81/64 |
| 2012/0100245 | A1 * | 4/2012 | Durina | B29C 45/234 425/564 |
| 2017/0057138 | A1 * | 3/2017 | Fattori | B29C 45/278 |
| 2017/0259481 | A1 * | 9/2017 | Slisse | B29C 45/28 |
| 2018/0099442 | A1 * | 4/2018 | Fairy | B29C 45/278 |

OTHER PUBLICATIONS

Freewheel Clutches: Products 9,10—Ball bearings, Needle bearings and Freewheel Clutches from Spekuma AB, Web. Archive.org, Dec. 22, 2017, XP055900608, Retrieved from the internet: URL: https://web.archive.org/web/20171222150540/https://www.spekuma.se/en/products/freewheel-Clutches/, Retrieved Mar. 14, 2022, pp. 1-2. Relevant to Claims, 9,10.

* cited by examiner

NOZZLE WITH REMOVABLE NOZZLE TIP CONFIGURED FOR IMPROVED HEATING

FIELD

The present application generally relates to injection molding machines and, more particularly, to a removable nozzle tip and nozzle assembly for use with an injection molding machine and an engagement tool and methods for replacing a nozzle tip.

BACKGROUND

Injection molding machines are used to produce plastic molded parts such as, for example, preforms of the type that are blow moldable into beverage containers. A hot runner system may be provided in injection molding machines to inject molten plastic into a mold. The hot runner system is an assembly of heated components and the heat serves to maintain the molten plastic at a desired consistency. The hot runner system may be controlled by a controller which controls a heater based on a temperature measured at a temperature sensor.

A hot runner system may include a nozzle having a nozzle housing and a nozzle tip. The nozzle tip may be detachable from the nozzle housing to allow for replacement of the nozzle tip. Nozzles typically include torque features, such as wrench flats or hex or 12-point sockets) to facilitate assembly and removal of the nozzle tip. However, these torque features often prevent efficient heat transfer from the nozzle heater to the nozzle tip and often cause the nozzle heater to be positioned away from a mold gate, causing poor control of the gate area and a poor thermal profile at the nozzle tip.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present application describes injection molding machines and, more particularly, a removable nozzle tip and nozzle assembly for use with an injection molding machine and an engagement tool and methods for replacing a nozzle tip. Some embodiments of the present application may provide improved heating near a mold gate associated with a nozzle.

In a first aspect, the present application describes an injection molding machine. The injection molding machine may include a nozzle for transferring melt to a mold cavity. The nozzle may include a nozzle housing and a nozzle tip threadably attached to the nozzle housing. At least a portion of an exterior wall of the nozzle housing and at least a portion of an exterior wall of the nozzle tip may align to provide a concentric cylindrical surface. The nozzle tip does not include a torque feature.

In another aspect, the present application describes nozzle assembly. The nozzle assembly may include a nozzle for transferring melt to a mold cavity. The nozzle may include a nozzle housing and a nozzle tip threadably attached to the nozzle housing. At least a portion of an exterior wall of the nozzle housing and at least a portion of an exterior wall of the nozzle tip may align to provide a concentric cylindrical surface. The nozzle assembly may further include a tubular heater enclosing at least a portion of the concentric cylindrical surface. The nozzle tip does not include a torque feature in any location that is downstream of the tubular heater and upstream of a mold gate of the nozzle.

In another aspect, the present application describes an engagement tool for attaching or detaching a nozzle tip to a nozzle housing. The engagement tool includes a clutch for engaging a cylindrical surface and a torque feature attached to the clutch.

In yet another aspect, the present application describes a method of replacing a nozzle tip in an injection molding machine. The method includes: placing an engagement tool on the nozzle tip at a cylindrical surface of the nozzle tip, the engagement tool having a clutch for engaging the cylindrical surface and a torque feature attached to the clutch; and applying a torque to the torque feature using a tool.

Other aspects and features of the present application will be understood by those of ordinary skill in the art from a review of the following description of examples in conjunction with the accompanying figures.

Figure 1:
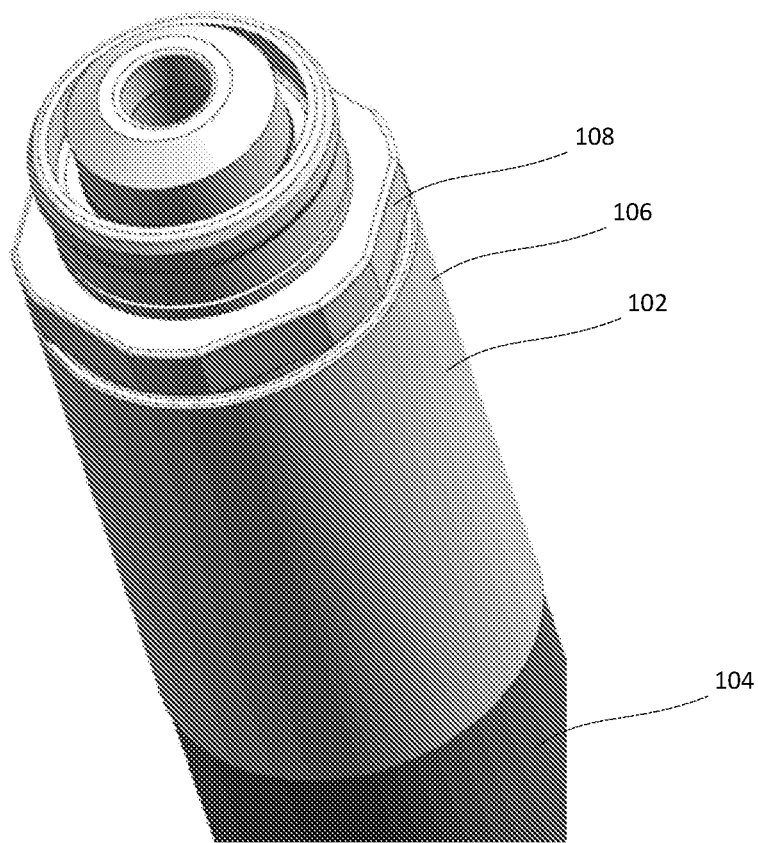
FIG. 1 is a perspective view of a conventional nozzle for an injection molding machine.
Figure 2:
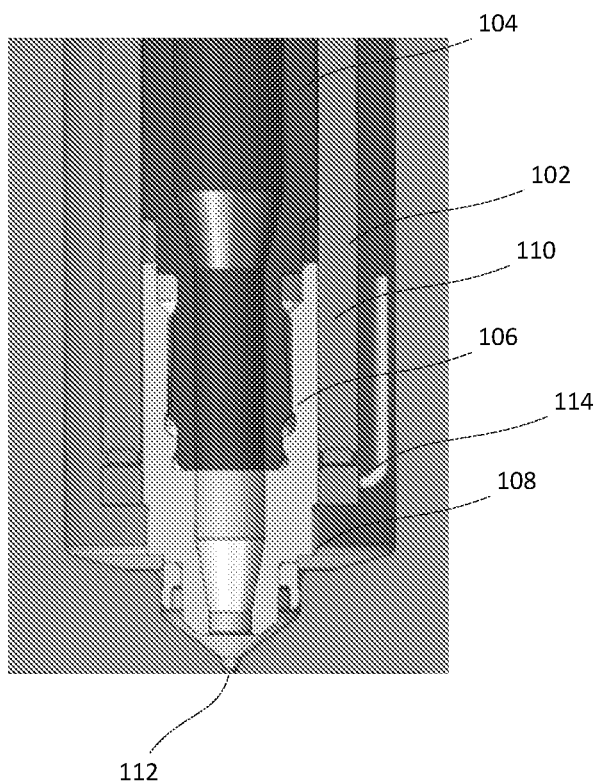
FIG. 2 is a cross-sectional view of a conventional nozzle for an injection molding machine.

Referring first to FIGS. 1 and 2, a conventional nozzle 102 for an injection molding machine is illustrated. FIG. 1 illustrates a perspective view and FIG. 2 illustrates a cross sectional view. The conventional nozzle 102 includes a nozzle housing 104 and a nozzle tip 106. The nozzle housing 104 is located upstream while the nozzle tip 106 is located downstream. That is, the nozzle housing receives molten plastic and feeds it to the nozzle tip 106 which expels the molten plastic at a mold gate 112.

The nozzle tip 106 is removably coupled to the nozzle housing 104. The nozzle tip 106 may connect to the nozzle housing 104 by threaded engagement. To facilitate removal of the nozzle tip 106 from the nozzle housing 104, the nozzle tip 106 may include one or more torque feature 108. The torque features may be, for example, a wrench-engaging feature, such as a wrench flat, which allows a tool, such as a wrench, to be used to directly grip the nozzle tip 106. A heater 110 encloses a portion of the nozzle 102. Since the heater 110 is a tubular heater (i.e., is generally tube-shaped) positioned over the nozzle 102 and since the torque feature 108 removes material from the outside diameter of the nozzle, the heater 110 is positioned behind the torque feature 108. That is, the heater 110 is positioned upstream with respect to the nozzle tip such that the distance between the torque feature 108 and the mold gate 112 is less than the distance between the heater 110 and the mold gate 112. The built-in torque feature 108 provided on the nozzle tip 106 causes the heater to be positioned away from the mold gate since the heater 110 must be placed behind the torque feature 108. Such positioning may yield poor thermal performance at the mold gate since the molten plastic may cool as it passes through the unheated portion of the nozzle tip 106.

A thermocouple 114 is also provided on or near the nozzle 102. As illustrated in FIG. 2, the thermocouple 114 is located behind the torque feature 108. That is, the thermocouple 114 is upstream from the torque feature 108. The thermocouple 114 generates a signal which indicates a temperature level. The signal is provided as an input to a hot runner controller (not shown) which controls the heater 110 to maintain a desired temperature. Notably, since the placement of the thermocouple 114 is restricted due to the presence of the torque feature 108, the temperature level reflected by the thermocouple may not be reflective of the temperature at or near the mold gate 112. That is, the torque feature 108 increases a gap between the thermocouple and the mold gate 112, causing the temperature level measured at the thermocouple to not be reflective of the temperature at or near the mold gate 112.

The gap that exists between the heater 110 (and/or the thermocouple) and the mold gate 112 can cause the molten plastic to assume a consistency that is not desired or optimal prior to expulsion through the mold gate 112. For example, in order to achieve the desired consistency at the mold gate 112, the hot runner controller may need to heat the molten plastic to a level that accounts for any cooling effects caused when the molten plastic passes through the non-heated portions of the nozzle 102. Such a technique can, however, cause problems. For example, the cooling profile may vary depending on environmental effects, such as the ambient temperature and the hot runner controller may not be suitably configured for all operating environments.

Figure 3:
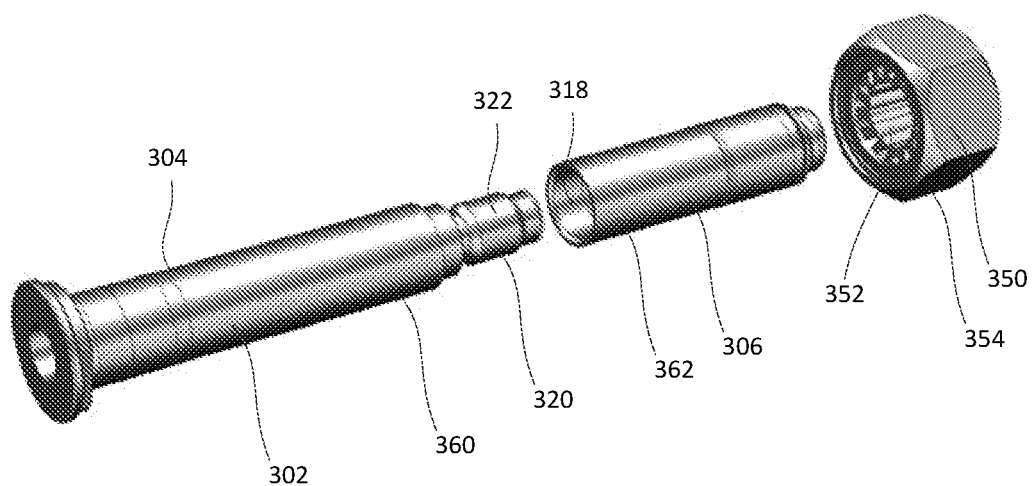
FIG. 3 is an exploded perspective view of a nozzle together with the engagement tool.
Figure 4:
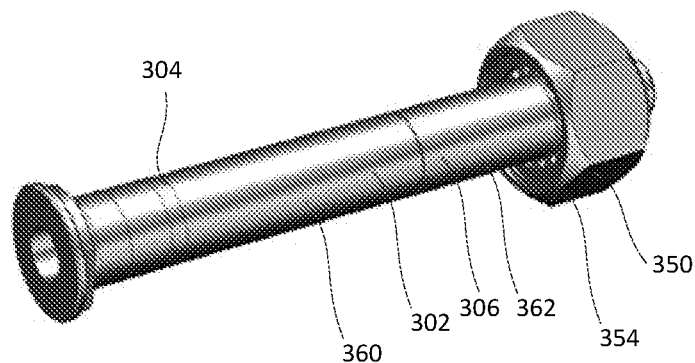
FIG. 4 is a perspective view of an assembled nozzle with an engagement tool applied thereon.
Figure 5:
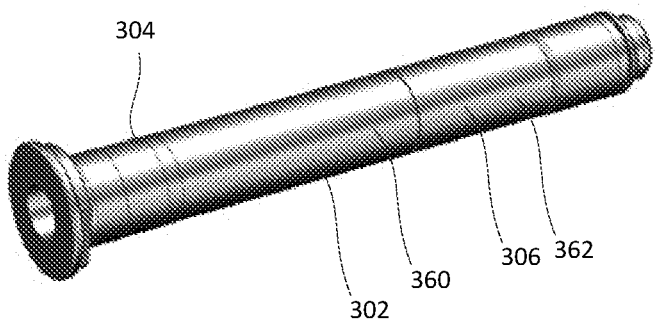
FIG. 5 is a perspective view of the assembled nozzle.
Figure 6:
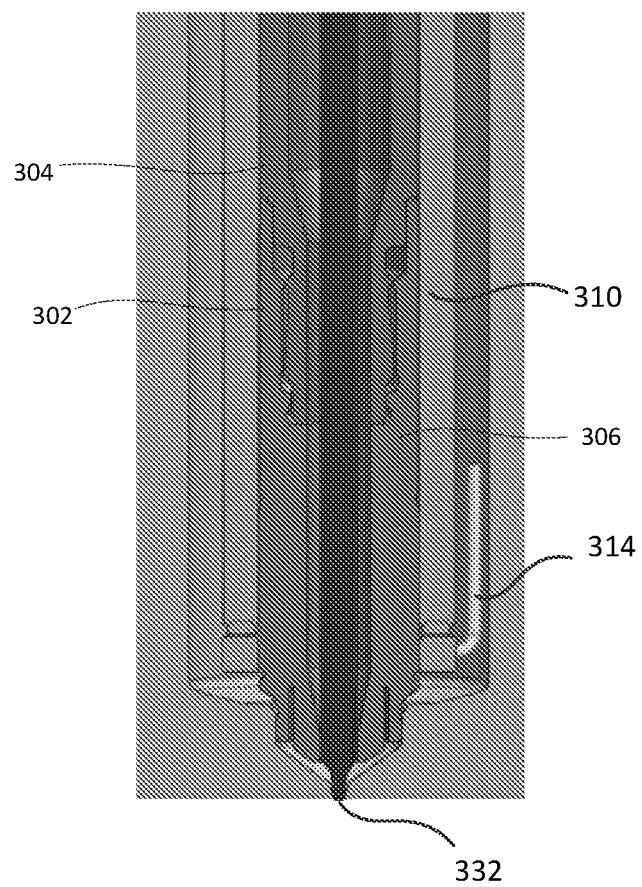
FIG. 6 illustrates a cross sectional view of the nozzle and a tubular heater provided thereon.

Referring now to FIGS. 3, 4, 5 and 6, an example nozzle 302 and engagement tool 350 which may address one or more deficiencies of convention nozzles is illustrated. FIG. 3 illustrates an exploded perspective view of the nozzle 302, together with the engagement tool 350. FIG. 4 illustrates a perspective view of an assembled nozzle 302 with the engagement tool 350 applied thereon. FIG. 5 illustrates the assembled nozzle 302. FIG. 6 illustrates a cross sectional view of the nozzle 302 and a tubular heater 310 provided thereon.

The nozzle 302 may be provided in an injection molding machine and may be for transferring melt (i.e., molten plastic) to a mold cavity. The nozzle 302 includes a nozzle housing 304 and a nozzle tip 306. As illustrated, for example, in FIG. 4, the nozzle tip 306 may be threadably attached to the nozzle housing 304. More specifically, the nozzle tip 306 may include threading at an interior surface 318 and the nozzle housing 304 may include threading 320 at an exterior surface 322. The threading provided on the nozzle tip 306 is configured to matingly engage the threading 320 on the nozzle housing 304. For example, the nozzle tip 306 may have female threading whereas the nozzle housing 304 may have male threading.

As illustrated in FIGS. 4 and 5, when the nozzle tip 306 is attached to the nozzle housing 304, a cylinder is formed. The cylinder may be continuous and concentric. That is, at least a portion of an exterior wall 360 of the nozzle housing 304 and at least a portion of an exterior wall 362 of the nozzle tip 306 may align to provide a concentric cylindrical surface, which may in some embodiments be a continuous cylindrical surface.

As illustrated in FIG. 6, the cylindrical surface provided by the nozzle tip 306 and the nozzle housing 304 allows a tubular heater 310 to be placed atop the nozzle 302. That is, the tubular heater 310 encloses at least a portion of the cylindrical surface provided by the nozzle tip 306 and the nozzle housing 304. For example, the tubular heater encloses at least a portion of the exterior wall 362 of the nozzle tip 306 and at least a portion of the exterior wall 360 of the nozzle housing 304.

The tubular heater 310 is electrically connected to a hot runner controller (not shown) which controls the tubular heater 310 to maintain a predetermined temperature condition. The hot runner controller is also electrically connected to a temperature sensor, such as a thermocouple 314 which generates an electrical signal based on a sensed temperature. As illustrated, the thermocouple 314 is located near a mold gate 332 associated with the nozzle 302. For example, the thermocouple 314 may be located within 5 millimeters of the mold gate 332. The thermocouple 314 may be positioned proximate to the mold gate 332 since the nozzle tip 306 does not include a torque feature in any location that is downstream of the tubular heater and upstream of the mold gate 332 of the nozzle 302. The thermocouple 314 may be positioned, for example, such that at least a portion of the thermocouple 314 is located between the mold gate 332 and threading provided internally on the nozzle tip 306. That is, at least a portion of the thermocouple 314 may be located downstream of the threading but upstream of the mold gate 332. As noted previously, the threading allows for attachment of the nozzle tip 306 to the nozzle housing 304.

The close proximity between the thermocouple 314 and the mold gate 332 allows the thermocouple to sense a temperature that is reflective of the temperature at the mold gate 332. Since this temperature may be used by the hot runner controller to control the tubular heater 310, the tubular heater may be controlled to produce a desired melt consistency at the mold gate 332.

Since the nozzle tip 306 does not include a torque feature (such as wrench flats or hex or 12-point sockets or another wrench-engaging feature), the tubular heater 310 may be placed in close proximity to the mold gate 332. For example, the tubular heater 310 may be located within 5 millimeters of the mold gate 332. It may be noted that, in the example illustrated, the nozzle tip 306 does not include any torque feature in any location that is downstream of the tubular heater 310 and upstream of the mold gate 332 of the nozzle 302.

Since the nozzle tip 306 does not include a torque feature, a wrench cannot directly engage the nozzle tip 306 to remove or attach the nozzle tip 306 to the nozzle housing 304. Instead, an engagement tool 350 may be used to facilitate attachment or detachment of the nozzle tip 306. The engagement tool 350, which is illustrated in FIGS. 3 and 4, includes a clutch 352 for engaging a cylindrical surface and a torque feature 354 attached to the clutch 352. The clutch 352 may be a one way rotation coupling that transmits torque in one direction and allows idling in the opposite direction and may, therefore, be referred to as a one-way clutch.

The clutch 352 may take various forms and may, for example, be a roller ramp clutch or a sprag clutch. The torque feature 354 may be a wrench-engaging feature such as wrench flats or a hex or 12-point socket.

The engagement tool 350 of FIGS. 3 and 4 includes a torque feature 354 that encloses the clutch 352. That is, the torque feature 354 houses the clutch such that the clutch 352 is provided internally within the torque feature 354. The engagement tool 350 of FIGS. 3 and 4 may have two open ends. For example, the engagement tool 350 may be placed on the nozzle tip 306 such that the nozzle tip 306 extends through the engagement tool 350. Then, an operator may apply a torque to the torque feature 354 using a tool such as a wrench in order to attach or detach the nozzle tip 306 while replacing a nozzle tip 306. Torque may be applied in one direction to remove the nozzle tip 306 from the nozzle housing 304 to which it is attached or torque may be applied in another direction to attach the nozzle tip 306 to the nozzle housing 304. Due to the one-way nature of the clutch, the engagement tool 350 may be placed on the nozzle tip in a different orientation for attachment than for detachment. It may be noted, however, that the two open ends of the engagement tool 350 of FIGS. 3 and 4 may allow the same engagement tool 350 to be used for both attachment and removal. The engagement tool 350 may receive the nozzle tip 306 through a different one of the openings during attachment than detachment.

Figure 7:
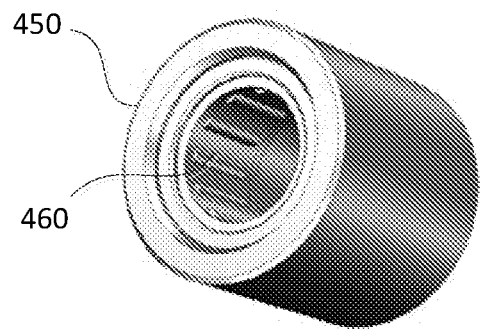
FIG. 7 illustrates a perspective view of an engagement tool at a first side of the engagement tool.
Figure 8:
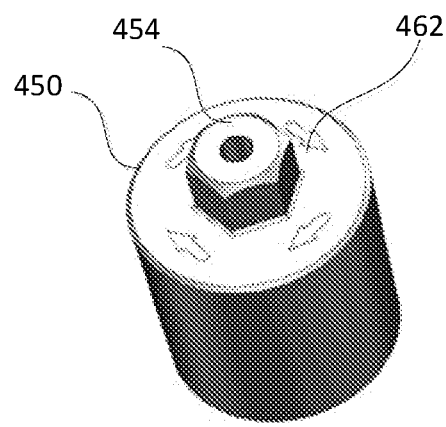
FIG. 8 illustrates a perspective view of an engagement tool at a second side of the engagement tool.
Figure 9:
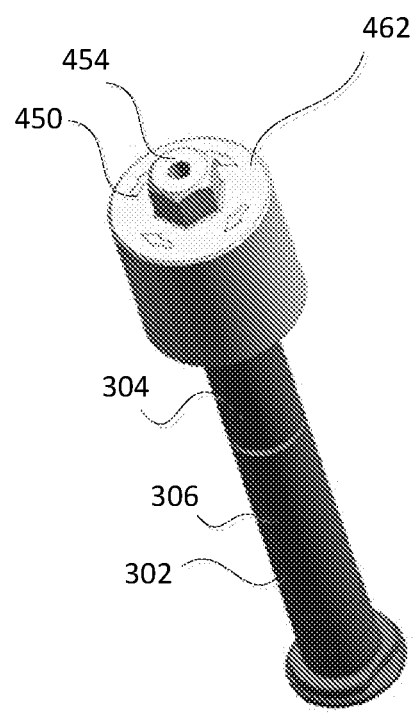
FIG. 9 illustrates a perspective view of an engagement tool applied to a nozzle.

The engagement tool may take other forms. For example, as illustrated at FIGS. 7 to 9, a torque feature 454 may be located at an end of the engagement tool 450. In this configuration, the torque feature 454 acts as a cap for an interior space provided by the clutch 352. That is, the engagement tool 450 of FIGS. 7 to 9 allows for single directional insertion since it only has one opening for receiving the nozzle tip. An open end 460 of the engagement tool 450 receives the nozzle tip 306 and a closed end 462, which may be closed in whole or in part by the torque feature 454 or by another feature, cannot receive the nozzle tip 306.

Due to the one-way nature of the clutch and since the engagement tool 450 of FIGS. 7 to 9 only allows for one-way insertion within the clutch, a different engagement tool 450 may be used for attaching the nozzle tip 306 than is used for detaching the nozzle tip 306. The engagement tool 450 may have indicia printed thereon indicating whether the engagement tool 450 is one that may be used for attachment or whether it is one that may be used for removal.

The nozzle tip 306 described above may be configured for engagement by the engagement tool 350, 450 and may, for example, include one or more feature to facilitate engagement by the engagement tool. Such features may include lead-in chamfers, blended radii, etc.

The nozzle assembly described herein, including the nozzle 302, the tubular heater 310 and the thermocouple 314, may be provided in an injection molding machine.

The present disclosure also contemplates methods of replacing, removing, and attaching a nozzle tip 306 of the type described herein on an injection molding machine.

For example, a method of replacing a nozzle tip 306 of a type described above with reference to FIGS. 3 to 6 in an injection molding machine may include placing an engagement tool 350, 450 on the nozzle tip 306 at a cylindrical surface of the nozzle tip 306. The engagement tool 350, 450 may be of the type described above with reference to FIGS. 3 to 6 or may be of the type described above with reference to FIGS. 7 to 9. Where the engagement tool is one that allows for both removal and attachment, the engagement tool 350 is placed on the nozzle tip 306 in a first orientation if attachment is desired and is placed in a second orientation if detachment is desired. Where the engagement tool is one that allows for only one of removal and attachment, an appropriate engagement tool may first be selected depending on whether attachment or detachment is to be performed.

After the engagement tool is placed to engage the nozzle tip, an operator may apply a torque to the torque feature 354 using a tool such as a wrench in order to attach or detach the nozzle tip 306 while replacing the nozzle tip 306 with another nozzle tip. Torque may be applied in one direction to remove the nozzle tip 306 from the nozzle housing 304 to which it is attached or torque may be applied in another direction to attach the nozzle tip 306 to the nozzle housing 304.

The engagement tool may take other forms. For example, in another embodiment, a collet-type device or chuck-type device could be used to grip the nozzle tip and then torque could be applied to the collet-type device or chuck-type device using a torque feature provided on or with the collet-type device or the chuck type device.

The terms upstream and downstream, as used herein convey locations associated with a nozzle assembly based on the direction of melt flow. It will be appreciated that melt flows through the nozzle so as to be expelled from the mold gate and so a location that is upstream from another location is one that is further from the mold gate than the other location whereas a location that is downstream from another location is one that is closer to the mold gate than the other location.

Certain adaptations and modifications of the described embodiments can be made. Therefore, the above discussed embodiments are considered to be illustrative and not restrictive.

What is claimed is:

1. An injection molding machine comprising:
    a nozzle for transferring melt to a mold cavity, the nozzle comprising:
        a nozzle housing defining an exterior surface, the nozzle housing including threading along the exterior surface;
        a nozzle tip defining an interior surface, the nozzle tip including threading along the interior surface that matingly engages the threading on the nozzle housing such that at least a portion of an exterior wall of the nozzle housing and at least a portion of an exterior wall of the nozzle tip aligns to form a single cylinder comprising a continuous cylindrical surface when the nozzle tip is threadably attached to the nozzle housing, wherein the nozzle tip does not include a torque means to facilitate assembly and removal of the nozzle tip;
        a tubular heater enclosing exterior walls of nozzle tip and nozzle housing portions of the cylinder, wherein the nozzle tip does not include a torque means in any location that is downstream of the tubular heater and upstream of a mold gate of the nozzle; and
        an engagement tool for attaching or detaching the nozzle tip to the nozzle housing, the engagement tool comprising:
            a clutch for engaging the cylindrical surface; and
            a torque feature attached to the clutch.

2. The injection molding machine of claim 1, wherein the tubular heater encloses at least a portion of the exterior wall of the nozzle tip.

3. The injection molding machine of claim 1, further comprising a thermocouple, and wherein the thermocouple is located near a mold gate associated with the nozzle.

4. The injection molding machine of claim 3, wherein at least a portion of the thermocouple is located between the mold gate and threading provided internally on the nozzle tip, the threading allowing for attachment with the nozzle housing.

5. The injection molding machine of claim 1, wherein at least a portion of the tubular heater is located between the mold gate and threading provided internally on the nozzle tip, the threading allowing for attachment with the nozzle housing.

6. The injection molding machine of claim 1, wherein the nozzle tip is configured for engagement by an engagement tool, the engagement tool including a clutch.

7. The injection molding machine of claim 6, wherein the nozzle tip includes at least one feature to facilitate engagement by the engagement tool.

8. The injection molding machine of claim 7, wherein the at least one feature comprises lead-in chamfers or blended radii.

\* \* \* \* \*